(12) United States Patent
Sekioka et al.

(10) Patent No.: US 12,297,378 B2
(45) Date of Patent: May 13, 2025

(54) ADHESIVE AGENT AND ADHESION METHOD

(71) Applicant: SHOWA DENKO K.K., Tokyo (JP)

(72) Inventors: Naoki Sekioka, Tokyo (JP); Akira Shibuya, Tokyo (JP); Noriko Ogawa, Tokyo (JP); Ryo Makio, Tokyo (JP)

(73) Assignee: Resonac Corporation, Tokyo (JP)

( * ) Notice: Subject to any disclaimer, the term of this patent is extended or adjusted under 35 U.S.C. 154(b) by 693 days.

(21) Appl. No.: 17/618,114

(22) PCT Filed: May 15, 2020

(86) PCT No.: PCT/JP2020/019519
§ 371 (c)(1),
(2) Date: Dec. 10, 2021

(87) PCT Pub. No.: WO2020/250621
PCT Pub. Date: Dec. 17, 2020

(65) Prior Publication Data
US 2022/0243101 A1 Aug. 4, 2022

(30) Foreign Application Priority Data
Jun. 12, 2019 (JP) ................................. 2019-109689

(51) Int. Cl.
*C09J 111/02* (2006.01)
*C09J 7/24* (2018.01)
*C09J 7/38* (2018.01)
*C09J 11/04* (2006.01)
*C09J 11/08* (2006.01)

(52) U.S. Cl.
CPC .............. *C09J 111/02* (2013.01); *C09J 7/243* (2018.01); *C09J 7/383* (2018.01); *C09J 11/04* (2013.01); *C09J 11/08* (2013.01); *C09J 2411/00* (2013.01); *C09J 2423/106* (2013.01)

(58) Field of Classification Search
CPC ..................................................... C09J 111/02
See application file for complete search history.

(56) References Cited

FOREIGN PATENT DOCUMENTS

| JP | 54-152037 A | 11/1979 |
| JP | 8-218044 A | 8/1996 |
| JP | 9-003423 A | 1/1997 |
| JP | 2007191710 A | * 8/2007 |
| JP | 2011-122141 A | 6/2011 |
| JP | 5043423 B2 | 10/2012 |

OTHER PUBLICATIONS

Machine translation of JP 2007191710 (2007, 11 pages).*
Derwent Abstract of JP 2007191710 (2007, 2 pages).*
International Search Report for PCT/JP2020/019519 dated Jul. 21, 2020 (PCT/ISA/210).
International Preliminary Report on Patentability with Translation of the Written Opinion issued Dec. 14, 2021 in International Application No. PCT/JP2020/019519.

* cited by examiner

*Primary Examiner* — Brieann R Johnston
(74) *Attorney, Agent, or Firm* — Sughrue Mion, PLLC

(57) ABSTRACT

There is provided an adhesive agent exhibiting high adhesive strength to polyolefin. An adhesive agent contains a chloroprene copolymer latex containing a chloroprene copolymer (A) and a metal oxide (B). The chloroprene copolymer (A) is a copolymer of a monomer group containing chloroprene (A-1), α,β-unsaturated carboxylic acid (A-2), and 2,3-dichloro-1,3-butadiene (A-3). The chloroprene copolymer (A) has a tetrahydrofuran-soluble component soluble in tetrahydrofuran and the weight average molecular weight of the tetrahydrofuran-soluble component is 80000 or more and 140000 or less. When the amount of the metal oxide (B) based on 100 parts by mass of the chloroprene copolymer (A) is defined as Y part(s) by mass and the weight average molecular weight of the tetrahydrofuran-soluble component is defined as X, the content of the metal oxide (B) satisfies Formula: $-1.2 \times X/100000 + 1.6 < Y < -4.2 \times X/100000 + 5.7$.

20 Claims, 1 Drawing Sheet

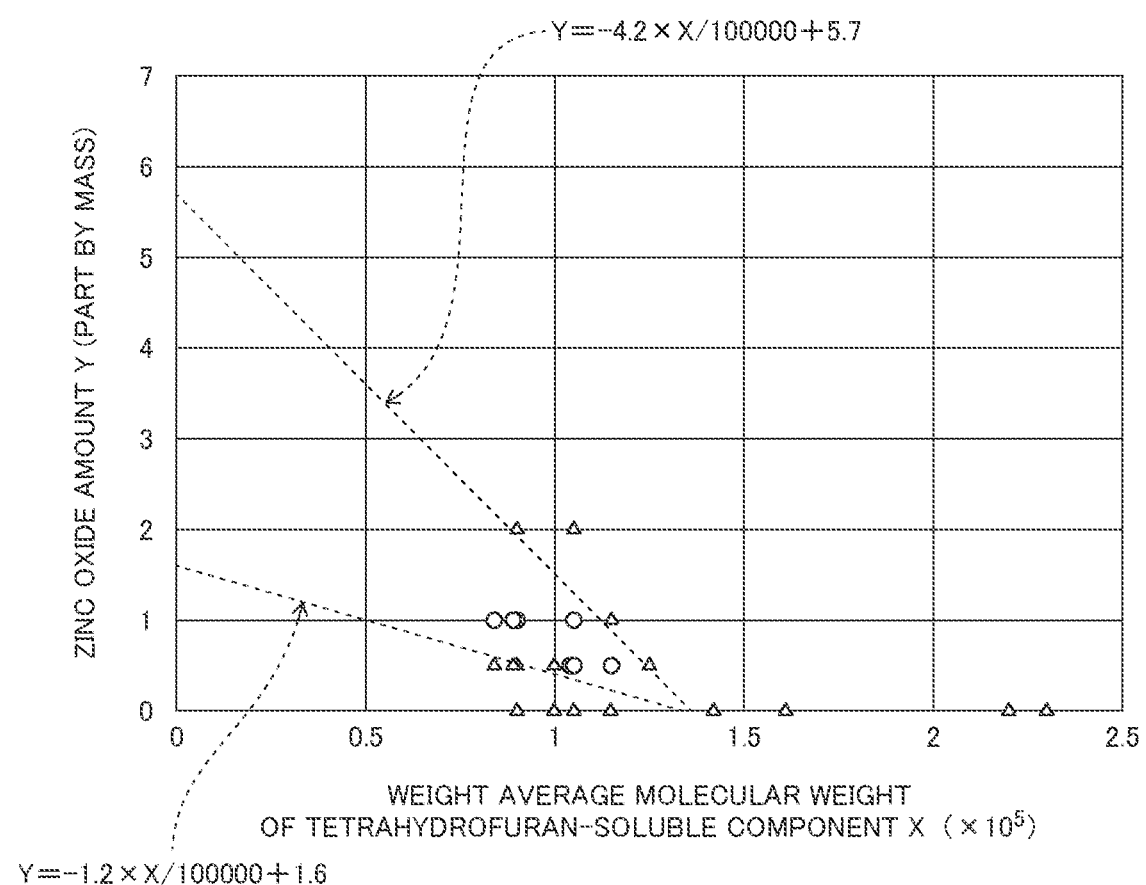

ADHESIVE AGENT AND ADHESION METHOD

CROSS REFERENCE TO RELATED APPLICATIONS

This application is a National Stage of International Application No. PCT/JP2020/019519 filed May 15, 2020, claiming priority based on Japanese Patent Application No. 2019-109689 filed Jun. 12, 2019.

TECHNICAL FIELD

The present invention relates to an adhesive agent and an adhesion method.

BACKGROUND ART

A copolymer of chloroprene and other monomers (hereinafter sometimes also referred to as "chloroprene copolymer") is suitably used as adhesive agents, such as organic solvent-based adhesive agents, because high adhesive strength to various kinds of adherends can be obtained at low pressure. To comply with Volatile Organic Chemicals (VOC) regulations and organic solvent regulations from the viewpoint of environmental pollution and human health considerations, the development of aqueous adhesives free from organic solvents has been advanced and aqueous adhesive agents containing a chloroprene copolymer latex have been proposed.

For example, PTL 1 has proposed an aqueous adhesive agent containing a latex of a copolymer containing chloroprene, $\alpha,\beta$-unsaturated carboxylic acid, and 2,3-dichloro-1,3-butadiene. By copolymerizing $\alpha,\beta$-unsaturated carboxylic acid, the adhesive strength (heat resistance) at high temperatures is improved. However, the aqueous adhesive agent disclosed in PTL 1 has posed a problem that the adhesive strength has been lower than that of conventional organic solvent-based adhesive agents.

Various technologies have been proposed as a technology of improving the adhesive strength of the aqueous adhesive agents containing the chloroprene copolymer latex. For example, PTL 2 has proposed an aqueous adhesive agent using a chloroprene copolymer latex free from organic solvent-insoluble components. PTL 3 has proposed an aqueous adhesive agent using a chloroprene copolymer latex containing a predetermined amount of organic solvent-insoluble components and a predetermined molecular weight of organic solvent-soluble components.

CITATION LIST

Patent Literatures

PTL 1: JP 8-218044 A
PTL 2: JP 9-3423 A
PTL 3: Japanese Patent No. 503423

SUMMARY OF INVENTION

Technical Problem

However, in recent years, adhesive agents are required to have adhesive strength to polyolefins, such as polypropylene and polyethylene. The aqueous adhesive agents disclosed in PTLS 1 to 3, however, have had insufficient adhesive strength to polyolefins.

It is an object of the present invention to solve the problems of the prior arts described above and provide an aqueous adhesive agent and an adhesion method exhibiting high adhesive strength to polyolefins.

Solution to Problem

In order to solve the above-described problems, one aspect of the present invention is as described in [1] to [10] below.

[1] An adhesive agent containing a chloroprene copolymer latex containing a chloroprene copolymer (A) and a metal oxide (B), in which the chloroprene copolymer (A) is a copolymer of a monomer group containing chloroprene (A-1), $\alpha,\beta$-unsaturated carboxylic acid (A-2), and 2,3-dichloro-1,3-butadiene (A-3), when the amount of the chloroprene copolymer (A) is 100 parts by mass, the chloroprene copolymer (A) contains 80.0 parts by mass or more and 99.4 parts by mass or less of a unit derived from the chloroprene (A-1), 0.5 part by mass or more and 10.0 parts by mass or less of a unit derived from the $\alpha,\beta$-unsaturated carboxylic acid (A-2), and 0.1 part by mass or more and 4.0 parts by mass or less of a unit derived from the 2,3-dichloro-1,3-butadiene (A-3), the chloroprene copolymer (A) has a tetrahydrofuran-soluble component soluble in tetrahydrofuran and the weight average molecular weight of the tetrahydrofuran-soluble component is 80000 or more and 140000 or less, and when the amount of the metal oxide (B) based on 100 parts by mass of the chloroprene copolymer (A) is defined as Y part(s) by mass and the weight average molecular weight of the tetrahydrofuran-soluble component is defined as X, the content of the metal oxide (B) satisfies Formula: $-1.2 \times X/100000 + 1.6 < Y < -4.2 \times X/100000 + 5.7$.

[2] The adhesive agent according to [1], in which the metal oxide (B) is zinc oxide.

[3] The adhesive agent according to [1] or [2], in which the $\alpha,\beta$-unsaturated carboxylic acid (A-2) is methacrylic acid.

[4] The adhesive agent according to any one of [1] to [3], in which the weight average molecular weight of the tetrahydrofuran-soluble component is 90000 or more and 136000 or less.

[5] The adhesive agent according to any one of [1] to [4], in which the chloroprene copolymer (A) has a gel insoluble in tetrahydrofuran and the content of the gel in the chloroprene copolymer (A) is 0.1% by mass or more and less than 15% by mass.

[6] The adhesive agent according to any one of [1] to [5], in which the chloroprene copolymer latex contains an emulsifier.

[7] The adhesive agent according to [6], in which the emulsifier is partially saponified polyvinyl alcohol.

[8] The adhesive agent according to any one of [1] to [7], which forms a film-like shape.

[9] The adhesive agent according to any one of [1] to [8], which is used for bonding of an adherend formed of polyolefin.

[10] An adhesion method including bonding two adherends using the adhesive agent according to any one of [1] to [8], in which at least one of the two adherends is formed of polyolefin.

Advantageous Effects of Invention

The present invention can provide an adhesive agent and an adhesion method exhibiting high adhesive strength to polyolefin.

BRIEF DESCRIPTION OF DRAWINGS

FIG. 1 is a graph illustrating an example of the relationship between an amount Y of a metal oxide (B) and a weight average molecular weight X of a tetrahydrofuran-soluble component.

DESCRIPTION OF EMBODIMENTS

One embodiment of the present invention will now be described below. This embodiment is an example of the present invention, and the present invention is not limited to this embodiment. Further, this embodiment can be variously altered or modified and embodiments obtained by such alternations or modifications may also be included in the present invention.

An adhesive agent according to one embodiment of the present invention is an adhesive agent containing a chloroprene copolymer latex containing a chloroprene copolymer (A) and a metal oxide (B). The chloroprene copolymer (A) is a copolymer of a monomer group containing chloroprene (A-1), α,β-unsaturated carboxylic acid (A-2), and 2,3-dichloro-1,3-butadiene (A-3).

When the amount of the chloroprene copolymer (A) is 100 parts by mass, the chloroprene copolymer (A) contains 80.0 parts by mass or more and 99.4 parts by mass or less of a unit derived from the chloroprene (A-1), 0.5 part by mass or more and 10.0 parts by mass or less of a unit derived from the α,β-unsaturated carboxylic acid (A-2), and 0.1 part by mass or more and 4.0 parts by mass or less of a unit derived from the 2,3-dichloro-1,3-butadiene (A-3).

The chloroprene copolymer (A) has a tetrahydrofuran-soluble component soluble in tetrahydrofuran. The weight average molecular weight of the tetrahydrofuran-soluble component is 80000 or more and 140000 or less. The chloroprene copolymer (A) preferably has a gel insoluble in tetrahydrofuran. The content of the gel in the chloroprene copolymer (A) is preferably 0.1% by mass or more and less than 15% by mass.

When the amount of the metal oxide (B) based on 100 parts by mass of the chloroprene copolymer (A) is defined as Y part(s) by mass and the weight average molecular weight of the tetrahydrofuran-soluble component is defined as X, the content of the metal oxide (B) in the adhesive according to this embodiment satisfies Formula: $-1.2 \times X/100000 + 1.6 < Y < -4.2 \times X/100000 + 5.7$.

Such an adhesive agent according to this embodiment is an aqueous adhesive agent free from organic solvents and exhibits high adhesive strength to polyolefin. Hence, the adhesive agent according to this embodiment is suitable for the bonding of adherends formed of polyolefin. More specifically, even when at least one of two adherends to be bonded is formed of polyolefin which is a material hard to be bonded, the two adherends can be bonded to each other by exhibiting high adhesive strength of 0.7 kN/m or more, for example. The adhesive agent according to this embodiment is also applicable to the bonding of adherends formed of materials other than polyolefin. The form of the adherend is not limited, and the adhesive agent according to this embodiment is usable for the bonding of foams, sheets, films, and the like. The adhesive agent in the present invention also includes pressure-sensitive adhesive agents.

Hereinafter, the adhesive agent and an adhesion method according to this embodiment are described in more detail. The adhesive agent according to this embodiment contains a latex. The latex is the chloroprene copolymer latex containing the chloroprene copolymer (A). The chloroprene copolymer (A) is the copolymer of the monomer group containing the chloroprene (A-1), the α,β-unsaturated carboxylic acid (A-2), and the 2,3-dichloro-1,3-butadiene (A-3).

[1] Chloroprene (A-1)

The chloroprene (A-1) which is the main monomer of the chloroprene copolymer (A) is a compound also referred to as 2-chloro-1,3-butadiene, CD.

[2] α,β-unsaturated carboxylic acid (A-2)

The α,β-unsaturated carboxylic acid (A-2) which is one monomer of the chloroprene copolymer (A) is carboxylic acid having a reactive double bond in its molecule. The kind of the α,β-unsaturated carboxylic acid (A-2) is not particularly limited and, for example, methacrylic acid, acrylic acid, itaconic acid, 2-ethyl methacrylate, 2-butyl acrylate, and the like can be mentioned. Among the above, methacrylic acid is more preferable. The α,β-unsaturated carboxylic acid (A-2) may be used alone or in combination of two or more kinds thereof.

[3] 2,3-dichloro-1,3-butadiene (A-3)

The 2,3-dichloro-1,3-butadiene (A-3) is one monomer of the chloroprene copolymer (A) and is copolymerized with other monomers, such as the chloroprene (A-1) and the α,β-unsaturated carboxylic acid (A-2), to generate the chloroprene copolymer (A).

[4] Fourth monomer (A-4) The chloroprene copolymer (A) may be a copolymer of three kinds of monomers of the chloroprene (A-1), the α,β-unsaturated carboxylic acid (A-2), and the 2,3-dichloro-1,3-butadiene (A-3) or may be a copolymer copolymerized with a fourth monomer (A-4), which is another monomer, together with the chloroprene (A-1), the α,β-unsaturated carboxylic acid (A-2), and the 2,3-dichloro-1,3-butadiene (A-3).

More specifically, the chloroprene copolymer (A) may be a copolymer of a monomer group containing the chloroprene (A-1), the α,β-unsaturated carboxylic acid (A-2), the 2,3-dichloro-1,3-butadiene (A-3), and the fourth monomer (A-4).

The fourth monomer (A-4) needs to have reactivity which allows the copolymerization with the chloroprene (A-1), the α,β-unsaturated carboxylic acid (A-2), and the 2,3-dichloro-1,3-butadiene (A-3).

The kind of the fourth monomer (A-4) is not particularly limited insofar as the reactivity is imparted and, for example, 1-chloro-1,3-butadiene, butadiene, isoprene, styrene, acrylonitrile, acrylic acid ester, methacrylic acid ester, and the like can be mentioned. As the fourth monomer (A-4), one kind of monomer may be used alone or two or more kinds of monomers may be used in combination.

[5] Chloroprene Copolymer (A)

The chloroprene copolymer (A) is a copolymer of a monomer group containing at least the chloroprene (A-1), the α,β-unsaturated carboxylic acid (A-2), and the 2,3-dichloro-1,3-butadiene (A-3). Among the units forming the chloroprene copolymer (A), the chloroprene copolymer (A) contains 80.0 parts by mass or more and 99.4 parts by mass or less of the unit derived from the chloroprene (A-1), 0.5 part by mass or more and 10.0 parts by mass or less of the unit derived from the α,β-unsaturated carboxylic acid (A-2), and 0.1 part by mass or more and 4.0 parts by mass or less of the unit derived from the 2,3-dichloro-1,3-butadiene (A-3). These numerical values are numerical values when the amount of the chloroprene copolymer (A) is 100 parts by mass.

The unit derived from the chloroprene (A-1) is contained in an amount of preferably 85.0 parts by mass or more and 98.0 parts by mass or less and more preferably 88.0 parts by mass or more and 96.0 parts by mass or less. The unit derived from the α,β-unsaturated carboxylic acid (A-2) is contained in an amount of preferably 2.0 parts by mass or more and 8.0 parts by mass or less and more preferably 3.0 parts by mass or more and 7.5 parts by mass or less. The unit derived from the 2,3-dichloro-1,3-butadiene (A-3) is contained in an amount of preferably 0.5 part by mass or more and 10.0 parts by mass or less and more preferably 0.75 part by mass or more and 5.0 parts by mass or less.

When the unit derived from the α,β-unsaturated carboxylic acid (A-2) is contained in an amount of 0.5 part by mass or more, the pressure-sensitive adhesive strength of the adhesive agent is sufficiently high. When the unit derived from the α,β-unsaturated carboxylic acid (A-2) is contained in an amount of 10.0 parts by mass or less, the amount of the α,β-unsaturated carboxylic acid (A-2) remaining after polymerization is small in addition to the fact that aggregates are hardly generated in the chloroprene copolymer latex. When the amount of the α,β-unsaturated carboxylic acid (A-2) remaining after polymerization, the odor of the adhesive agent is low and the adhesive strength and the pressure-sensitive adhesive strength of the adhesive agent are sufficiently high.

When the unit derived from the 2,3-dichloro-1,3-butadiene (A-3) is contained in an amount of 0.1 part by mass or more, the pressure-sensitive adhesive strength of the adhesive agent is sufficiently high. When the unit derived from the 2,3-dichloro-1,3-butadiene (A-3) is contained in an amount of 4.0 parts by mass or less, the crystallinity of the chloroprene copolymer (A) is lowered, and therefore the pressure-sensitive adhesive strength of the adhesive agent is sufficiently high.

When the chloroprene copolymer (A) is the copolymer of the monomer group containing the chloroprene (A-1), the α,β-unsaturated carboxylic acid (A-2), the 2,3-dichloro-1,3-butadiene (A-3), and the fourth monomer (A-4), the content of the fourth monomer (A-4) is not particularly limited. Among the units forming the chloroprene copolymer (A), the chloroprene copolymer (A) preferably contains 80.0 parts by mass or more and 99.4 parts by mass or less of the unit derived from the chloroprene (A-1), 0.5 part by mass or more and 10.0 parts by mass or less of the unit derived from the α,β-unsaturated carboxylic acid (A-2), 0.1 part by mass or more and 4.0 parts by mass or less of the unit derived from the 2,3-dichloro-1,3-butadiene (A-3), and more than 0.0 part by mass and 10.0 parts by mass or less of a unit derived from the fourth monomer (A-4). When the unit derived from the fourth monomer (A-4) is contained in an amount of more than 0.0 part by mass and 10.0 parts by mass or less, the adhesive strength and the pressure-sensitive adhesive strength of the adhesive agent are likely to be higher.

When the chloroprene copolymer (A) is the copolymer of the monomer group containing the chloroprene (A-1), the α,β-unsaturated carboxylic acid (A-2), the 2,3-dichloro-1,3-butadiene (A-3), and the fourth monomer (A-4), the unit derived from the chloroprene (A-1) is contained in an amount of more preferably 85.0 parts by mass or more and 97.0 parts by mass or less and still more preferably 94.0 parts by mass or more and 97.0 parts by mass or less.

Similarly, the unit derived from the α,β-unsaturated carboxylic acid (A-2) is contained in an amount of more preferably 1.0 part by mass or more and 5.0 parts by mass or less and more preferably 2.0 parts by mass or more and 4.0 parts by mass or less. Similarly, the unit derived from the 2,3-dichloro-1,3-butadiene (A-3) is contained in an amount of more preferably 0.3 part by mass or more and 3.0 parts by mass or less and still more preferably 0.5 part by mass or more and 2.0 parts by mass or less. Similarly, the unit derived from the fourth monomer (A-4) is contained in an amount of more preferably 0.1 part by mass or more and 7.0 parts by mass or less and still more preferably 0.5 part by mass or more and 5.0 parts by mass or less.

These numerical values are numerical values when the total amount of the unit derived from the chloroprene (A-1), the unit derived from the α,β-unsaturated carboxylic acid (A-2), the unit derived from the 2,3-dichloro-1,3-butadiene (A-3), and the unit derived from the fourth monomer (A-4) contained in the chloroprene copolymer (A) is 100 parts by mass.

The chloroprene copolymer (A) preferably has a gel insoluble in tetrahydrofuran and a tetrahydrofuran-soluble component soluble in tetrahydrofuran. The weight average molecular weight of the tetrahydrofuran-soluble component is 80000 or more and 140000 or less. The content of the gel in the chloroprene copolymer (A) is preferably 0.1% by mass or more and less than 15.0% by mass. The gel in the present invention is a component insoluble in tetrahydrofuran in the chloroprene copolymer (A).

The content of the gel in the chloroprene copolymer (A) is preferably 0.3% by mass or more and 10.0% by mass or less and more preferably 0.5% by mass or more and 8.0% by mass or less. The weight average molecular weight of the tetrahydrofuran-soluble component is preferably 85000 or more and 136000 or less, more preferably 90000 or more and 136000 or less, and still more preferably 90000 or more and 110000 or less. Alternatively, the weight average molecular weight of the tetrahydrofuran-soluble component may be less than 100000.

When the content of the gel in the chloroprene copolymer (A) is 0.1% by mass or more, the strength of the adhesive agent (for example, adhesive agent formed in a film-like shape) is sufficiently high. On the other hand, when the content of the gel in the chloroprene copolymer (A) is less than 15% by mass, the pressure-sensitive adhesive strength of the adhesive agent is sufficiently high (for example, 0.4 kN/m or more).

When the weight average molecular weight of the tetrahydrofuran-soluble component is 80000 or more, the adhesive strength of the adhesive agent is sufficiently high. On the other hand, when the weight average molecular weight of the tetrahydrofuran-soluble component is 140000 or less, the pressure-sensitive adhesive strength of the adhesive agent is sufficiently high.

The weight average molecular weight (Mw) of the tetrahydrofuran-soluble component is the weight average molecular weight in terms of polystyrene measured by gel permeation chromatography (hereinafter referred to as "GPC"). When measuring the weight average molecular weight of the prepared-soluble component, a solution phase is separated, and then a diluted solution obtained by diluting the solution phase with tetrahydrofuran is subjected to GPC measurement in the same manner as in a measuring method for the content of the gel in the chloroprene copolymer (A).

[6] Chloroprene Copolymer Latex

The chloroprene copolymer latex of the present invention is one in which the chloroprene copolymer (A) emulsified by an emulsifier is dispersed in water in the form of particles. The chloroprene copolymer latex of this embodiment is one in which the particles of the chloroprene copolymer (A) are dispersed in water by an emulsifier and can be obtained by performing radical emulsion polymerization of the chloroprene (A-1), the α,β-unsaturated carboxylic acid (A-2), and the 2,3-dichloro-1,3-butadiene (A-3) and, as desired, the fourth monomer (A-4) in an aqueous medium.

The pH of the chloroprene copolymer latex of this embodiment is preferably 4.5 or more and 8.5 or less, more preferably 5.0 or more and 8.5 or less, and still more preferably 6.0 or more and 8.0 or less at 25° C. When the pH is in the ranges above, a deterioration of the adherend, such as hydrolysis or rusting, is less likely to occur even when a material forming the adherend is resin or metal. For example, hydrolysis of polyurethane or dissolution of aluminum is less likely to occur. pH regulators may be added to the chloroprene copolymer latex to bring the pH of the chloroprene copolymer latex in the ranges above. Preferable examples of the pH regulators include acids and bases, and amines, such as diethanolamine and triethanolamine, are more preferable.

The solid content concentration of the chloroprene copolymer latex in this embodiment is preferably 35% by mass or more and 65% by mass or less, more preferably 37% by mass or more and 60% by mass or less, and still more preferably 40% by mass or more and 55% by mass or less. When the solid content concentration is in the ranges above, a reduction in drying time of the chloroprene copolymer latex and a reduction in a load on a drying device of the chloroprene copolymer latex can be achieved. Further, when the solid content concentration is in the ranges above, it becomes much easier to maintain the colloidal stability of the particles of the chloroprene copolymer (A) in the chloroprene copolymer latex, so that the generation of aggregates can be minimized.

[7] Method for Manufacturing Chloroprene Copolymer Latex

The chloroprene copolymer latex can be obtained by performing radical emulsion polymerization of the chloroprene (A-1), the α,β-unsaturated carboxylic acid (A-2), the 2,3-dichloro-1,3-butadiene (A-3), and, as desired, the fourth monomer (A-4) in an aqueous medium as described above.

The content of the gel and the weight average molecular weight of the tetrahydrofuran-soluble component in the chloroprene copolymer (A) generated by the radical emulsion polymerization can be controlled by the kind of emulsifiers, chain transfer agents, polymerization initiators, and polymerization terminators used for the radical emulsion polymerization or the radical emulsion polymerization conditions (for example, polymerization conversion, polymerization temperature).

The kind of the emulsifiers is not particularly limited and emulsifiers exhibiting emulsifying ability even at a low pH are usable because the α,β-unsaturated carboxylic acid (A-2) is water-soluble. For example, examples of anionic emulsifiers include dodecylbenzene sulfonates, such as sodium dodecylbenzene sulfonate and triethanolamine dodecylbenzene sulfonate, diphenyl ether sulfonates, such as sodium diphenyl ether sulfonate and ammonium diphenyl ether sulfonate, and naphthalene sulfonates, such as a sodium salt of β-naphthalene sulfonate formaldehyde condensate.

Examples of nonionic emulsifiers include polyvinyl alcohol, partially saponified polyvinyl alcohol, polyoxyethylene nonylphenyl ether, polyoxyethylene octylphenyl ether, polyoxyethylene lauryl ether, and the like.

Among these emulsifiers, partially saponified polyvinyl alcohol is more preferable because the colloidal stability during storage of the chloroprene copolymer latex and the adhesive agent is good and bleed-out of a surfactant is less likely to occur after drying. The emulsifiers may be used alone or in combination of two or more kinds thereof.

The use amount of the emulsifier in the radical emulsion polymerization is not particularly limited. The emulsifier is preferably used in the range of 1.0 part by mass or more and 8.0 parts by mass or less, more preferably used in the range of 1.5 parts by mass or more and 6.0 parts by mass or less, and still more preferably used in the range of 2.0 parts by mass or more and 5.0 parts by mass or less based on the total amount of 100 parts by mass of all monomers.

When the use amount of the emulsifier is 1.0 part by mass or more, a sufficiently good emulsified state can be obtained, and therefore the polymerization heat is controlled, and therefore problems of the formation of aggregates, a poor product appearance, and the like are less likely to occur. On the other hand, when the use amount of the emulsifier is 8.0 parts by mass or less, the emulsifier is less likely to remain, and therefore problems of a reduction in water resistance of the chloroprene copolymer (A), a reduction in the pressure-sensitive adhesive strength and the adhesive strength, foaming and a color tone deterioration of products during drying, and the like are less likely to occur.

The kind of the chain transfer agents is not particularly limited and xanthogen disulfide, thioglycolic acid ester, and alkyl mercaptan are usable. Specific examples thereof include diisopropyl xanthogen disulfide, diethyl xanthogen disulfide, dicyclohexyl xanthogen disulfide, dilauryl xanthogen disulfide, dibenzyl xanthogen disulfide, methyl thioglycolate, 2-ethylhexyl thioglycolate, methoxybutyl thioglycolate, n-dodecyl mercaptan, n-decyl mercaptan, octyl mercaptan, and the like. These chain transfer agents may be used alone or in combination of two or more kinds thereof.

The kind of the polymerization initiators is not particularly limited and common radical polymerization initiators are usable. In the case of the emulsion polymerization, organic peroxides, such as benzoyl peroxide and tert-butyl hydroperoxide, inorganic peroxides, such as potassium persulfate and ammonium persulfate, and azo compounds, such as azobisisobutyronitrile, are used, for example. The polymerization initiators may be used alone or in combination of two or more kinds thereof. Further, promoters, such as anthraquinone sulfonate, potassium sulfite, and sodium sulfite, may be used in combination with the polymerization initiators as appropriate. The promoters may be used alone or in combination of two or more kinds thereof.

For the purpose of obtaining the chloroprene copolymer (A) having a desired molecular weight and a desired molecular weight distribution during the radical emulsion polymerization, the polymerization terminators may be added to terminate the reaction when a predetermined polymerization rate is reached. The kind of the polymerization terminators is not particularly limited and phenothiazine, para-t-butylcatechol, hydroquinone, hydroquinone monomethyl ether, diethylhydroxylamine, and the like are usable, for example. The polymerization terminators may be used alone or in combination of two or more kinds thereof.

The polymerization conversion in manufacturing the chloroprene copolymer (A) of this embodiment is not particularly limited and is preferably 90% or more, more preferably 95% or more, and still more preferably 98% or more. When the polymerization conversion is 90% or more, the solid content concentration of the chloroprene copolymer latex is sufficient, and therefore a problem of the application of a load on a drying step after applying the adhesive agent to an adherend and a problem of difficulty of forming the adhesive agent in a film-like shape with a uniform thickness are less likely to occur. Further, problems of reductions in pressure-sensitive adhesive strength and adhesive strength of the adhesive agent are less likely to occurs.

The polymerization temperature in manufacturing the chloroprene copolymer (A) of this embodiment is not particularly limited and is preferably set to 30° C. or more and 60° C. or less, more preferably set to 35° C. or more and 55° C. or less, and still more preferably set to 40° C. or more and 50° C. or less. When the polymerization temperature is 30° C. or more, the productivity of the chloroprene copolymer (A) is likely to be high and the pressure-sensitive adhesive strength of the adhesive agent is likely to be sufficient. On the other hand, when the polymerization temperature is 60° C. or less, the vapor pressure of the chloroprene (A-1) is less likely to increase during the polymerization, and therefore the polymerization operation is easily performed and the mechanical properties, such as tensile strength, of the chloroprene copolymer (A) to be obtained are likely to be sufficiently high.

[8] Metal Oxide (B)

The adhesive agent of this embodiment contains the chloroprene copolymer latex and the metal oxide (B). The content of the metal oxide (B) in the adhesive agent of this embodiment is as follows. More specifically, the content of the metal oxide (B) is an amount satisfying Formula: $-1.2 \times X/100000+1.6 < Y < -4.2 \times X/100000+5.7$, when the amount of the metal oxide (B) based on 100 parts by mass of the chloroprene copolymer (A) is defined as Y part (s) by mass and the weight average molecular weight of the tetrahydrofuran-soluble component is defined as X.

Formula above is preferably $-1.5 \times X/100000+2.0 < Y < -3.7 \times X/100000+5.0$ and more preferably $-3.4 \times X/100000+4.0 < Y < -5.1 \times X/100000+6.1$.

The adhesive agent containing the metal oxide (B) having a content satisfying Formula above has excellent adhesive strength and exhibits high adhesive strength (for example, 0.7 kN/m or higher) to polyolefins, such as polyethylene and polypropylene, because a carboxy group of the chloroprene copolymer (A) and the metal oxide (B) are ionically cross-linked with each other. Hence, even when at least one of two adherends to be bonded is formed of polyolefin, which is a material difficult to be bonded, the two adherends can be strongly bonded to each other by interposing the adhesive agent of this embodiment between the two adherends.

Even when at least one of two adherends to be bonded is an adherend formed of porous materials, the two adherends can be strongly bonded to each other. Specific examples of the adherend formed of porous materials include porous bodies formed of polyolefins, such as polyethylene and polypropylene. The porous adherend is preferable because the surface of the adherend has irregularities.

When the content of the metal oxide (B) satisfies Formula above, the ionically cross-linked amount between the carboxy group of the chloroprene copolymer (A) and the metal oxide (B) is an appropriate amount, and therefore the adhesive agent has excellent adhesive strength. Further, the colloidal stability of the particles of the chloroprene copolymer (A) in the chloroprene copolymer latex is good, and therefore the thickening of the adhesive agent is less likely to occur. In addition, the strength of the adhesive agent (e.g., adhesive agent formed in a film-like shape) is sufficiently high.

The kind of the metal oxide (B) is not particularly limited, and examples thereof include zinc oxide, magnesium oxide, lead oxide, lead tetroxide, antimony trioxide, and the like. These metal oxides (B) may be used alone or in combination of two or more kinds thereof. Among the metal oxides (B), zinc oxide is preferable because zinc oxide is likely to be cross-linked with the carboxy group of the chloroprene copolymer (A).

The adhesive agent of this embodiment can be manufactured by adding powder of the metal oxide (B) to the chloroprene copolymer latex, followed by mixing. When the powder of the metal oxide (B) is insoluble in water or when the powder of the metal oxide (B) destabilizes the colloidal state of the chloroprene copolymer (A), it is preferable to prepare a dispersion liquid (slurry), in which the powder of the metal oxide (B) is dispersed in water, in advance, and then add the dispersion liquid to the chloroprene copolymer latex, followed by mixing.

The volume average particle size measured by a dynamic light scattering method of the metal oxide (B) is preferably 10.0 μm or less, more preferably 1.0 μm or less, and still more preferably 0.5 μm or less. When the volume average particle size of the metal oxide (B) is 10.0 μm or less, particles of the metal oxide (B) are less likely to precipitate, and the dispersibility after compounded in the chloroprene copolymer latex is excellent. The volume average particle size of the metal oxide (B) can be measured by a dynamic light scattering method using a Zeta Sizer Nano S manufactured by Malvern Panalytical.

Although the adhesive agent of this embodiment can be formed of only the chloroprene copolymer latex and the metal oxide (B), the adhesive agent of this embodiment may contain additives, such as acid acceptors, antioxidants, fillers, pressure-sensitive adhesion imparting agents, pigments, dyes, colorants, wetting agents, defoaming agents, and thickeners, insofar as the object of the present invention is not impaired.

For example, the pressure-sensitive adhesion imparting agents may be compounded for the purpose of improving the adhesive strength. The kind of the pressure-sensitive adhesion imparting agents is not particularly limited, and examples thereof include phenolic resins, terpene resins, rosin derivative resins, petroleum hydrocarbons, and the like. Specific examples of the pressure-sensitive adhesion imparting agents include hydrogenated rosin, pentaerythritol ester of hydrogenated rosin, polymerized rosin, rosin-modified resin containing rosin as a main component, alkyl phenolic resin, rosin-modified phenolic resin, terpene-modified phenolic resin, and natural terpene resin. The pressure-sensitive adhesion imparting agents may be used alone or in combination of two or more kinds thereof.

The compounded amount of the pressure-sensitive adhesion imparting agents is preferably 10 parts by mass or more and 60 parts by mass or less, more preferably 20 parts by mass or more and 55 parts by mass or less, and still more preferably 25 parts by mass or more and 50 parts by mass or less based on the solid content of 100 parts by mass of the chloroprene copolymer latex. When the compounded amount of the pressure-sensitive adhesion imparting agents is in the ranges above, the pressure-sensitive adhesiveness is sufficiently ensured and the adhesive strength can be sufficiently improved. A method for compounding the pressure-sensitive adhesion imparting agent is not particularly limited. The pressure-sensitive adhesion imparting agent can be compounded by, for example, adding the pressure-sensitive adhesion imparting agent in the form of an emulsion, in which the pressure-sensitive adhesion imparting agent is emulsion-dispersed, to the chloroprene copolymer latex.

EXAMPLES

The present invention is described in more detail by illustrating Examples and Comparative Examples below.

Example 1

(1) Preparation of Chloroprene Copolymer Latex

Into a reactor with an internal volume of 3 L, 960 g of chloroprene (manufactured by SHOWA DENKO K.K.), 32.5 g of methacrylic acid (manufactured by Tokyo Chemical Industry Co., Ltd.), 7.5 g of 2,3-dichloro-1,3-butadiene (manufactured by SHOWA DENKO K.K.), 41 g of polyvinyl alcohol (emulsifier, trade name PVA-205 manufactured by Kuraray Co., Ltd.), 6 g of N-lauroylethanolamide (trade name Tohol (registered trademark) N-230 manufactured by TOHO Chemical Industry Co., Ltd.), 9 g of n-dodecyl mercaptan (chain transfer agent, manufactured by Tokyo Chemical Industry Co., Ltd.), 3 g of 2-ethylhexyl thioglycolate (chain transfer agent, manufactured by Tokyo Chemical Industry Co., Ltd.), and 1058 g of pure water were charged, followed by stirring at 40° C. for 15 minutes for emulsification to give an emulsion.

To this emulsion, 1.5 g of sodium sulfite (promoter, manufactured by Daito Chemical Co., Ltd.) was added, and then 2.3 g of potassium persulfate (manufactured by Junsei Chemical Co., Ltd.) was added as a polymerization initiator to cause polymerization at 45° C. in a nitrogen gas atmosphere. After confirming that the polymerization conversion was 95% or more, an emulsion of phenothiazine was immediately added to terminate the polymerization to give chloroprene copolymer latex. The polymerization conversion of the obtained chloroprene copolymer latex was 96.0%. Diethanolamine (manufactured by Nippon Shokubai Co., Ltd.) was added to the obtained chloroprene copolymer latex to adjust the pH to near neutral. The pH at 25° C. before the pH adjustment was 3.7, the pH at 25° C. after the pH adjustment was 7.4, and the solid content concentration was 45.6% by mass.

(2) Manufacturing of Adhesive Agent

To 43.5 g of the obtained chloroprene copolymer latex, 0.2 g of zinc oxide slurry (AZ-SW manufactured by OSAKI INDUSTRY Co., Ltd., volume average particle diameter: 0.2 solid content concentration: 50% by mass, dispersion medium: water), 11.5 g of terpene phenolic resin emulsion (trade name Tamanol E-100 manufactured by Arakawa Chemical Industries, Ltd., solid content concentration: 52% by mass) which is the pressure-sensitive adhesion imparting agent, 0.2 g of a wetting agent (trade name Nopco Wet 50 manufactured by SAN NOPCO LIMITED), and 0.03 g of a thickener (trade name SN Thickener 612 manufactured by SAN NOPCO LIMITED) were added, followed by sufficient stirring to give an adhesive agent.

The used amounts of raw materials used in the preparation of the chloroprene copolymer latices and the manufacturing of the adhesive agents are collectively illustrated in Table 1. The units of the use amounts of the raw materials in Table 1 are part(s) by mass. The amounts of the chloroprene copolymer (chloroprene copolymer in the chloroprene copolymer latex), the zinc oxide, and the pressure-sensitive adhesion imparting agent used in the manufacturing of the adhesive agents are illustrated in terms of solid content.

TABLE 1

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Chloroprene Copolymer latex | Chloroprene (part by mass) | 96.00 | 96.00 | 96.00 | 96.25 | 95.75 | 95.75 | 94.00 | 91.50 |
|  | Methacrylic acid (part by mass) | 3.25 | 3.25 | 3.25 | 3.00 | 3.25 | 3.25 | 5.00 | 7.50 |
|  | 2,3-dichloro-1,3-butadiene (part by mass) | 0.75 | 0.75 | 0.75 | 0.75 | 1.00 | 1.00 | 1.00 | 1.00 |
|  | Polyvinyl alcohol (part by mass) | 4.1 | 4.1 | 4.1 | 4.1 | 4.1 | 4.1 | 4.1 | 3.0 |
|  | N-lauroylethanolamide (part by mass) | 0.6 | 0.6 | 0.6 | 0.6 | 0.6 | 0.6 | 0.6 | 0.6 |
|  | n-dodecyl mercaptan (part by mass) | 0.9 | 0.9 | 0.9 | 0.9 | 0.9 | 0.9 | 0.9 | 0.9 |
|  | 2-ethylhexyl thioglycolate (part by mass) | 0.3 | 0.33 | 0.33 | 0.3 | 0.33 | 0.33 | 0.57 | 0.43 |
|  | Pure water (part by mass) | 106 | 106 | 106 | 106 | 106 | 106 | 106 | 106 |
|  | pH | 7.4 | 7.7 | 7.7 | 7.6 | 7.6 | 7.6 | 6.9 | 7.1 |
|  | Solid content concentration (% by mass) | 45.6 | 45.8 | 45.8 | 47.3 | 47.2 | 47.2 | 47.2 | 45.1 |
|  | Gel content (% by mass) | 5.3 | 4.9 | 4.9 | 3.4 | 3.2 | 3.2 | 3.2 | 1.9 |
|  | Weight average molecular weight of tetrahydrofuran-soluble component ($\times 10^5$) | 1.15 | 1.05 | 1.05 | 1.04 | 0.90 | 0.90 | 0.84 | 0.89 |
|  | Y value obtained by substituting molecular weight above into $-1.2 \times X/100000 + 1.6$ | 0.22 | 0.34 | 0.34 | 0.35 | 0.52 | 0.52 | 0.59 | 0.53 |
|  | Y value obtained by substituting molecular weight above into $-4.2 \times X/100000 + 5.7$ | 0.87 | 1.29 | 1.29 | 1.32 | 1.93 | 1.93 | 2.17 | 1.96 |
| Adhesive agent | Chloroprene copolymer (part by mass) | 100 | 100 | 100 | 100 | 100 | 100 | 100 | 100 |
|  | Zinc oxide (part by mass) | 0.5 | 0.5 | 1.0 | 0.5 | 1.0 | 1.0 | 1.0 | 1.0 |
|  | Pressure-sensitive adhesion imparting agent (part by mass) | 30 | 30 | 30 | 30 | 30 | 30 | 30 | 30 |
|  | Wetting agent (part by mass) | 1.0 | 1.0 | 1.0 | 1.0 | 1.0 | 1.0 | 1.0 | 1.0 |
|  | Thickener (part by mass) | 0.2 | 0.2 | 0.2 | 0.2 | 0.2 | 0.2 | 0.2 | 0.2 |
|  | Pressure-sensitive adhesive strength (nK/m) | 0.98 | 0.94 | 0.91 | 1.09 | 0.94 | 1.16 | 0.92 | 0.77 |
|  | Peeling mode | Cohesive failure | Cohesive failure | Interfacial failure | Cohesive failure | Cohesive failure | Cohesive failure | Cohesive failure | Cohesive failure |

TABLE 2

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Chloroprene Copolymer latex | Chloroprene (part by mass) | 96.00 | 96.00 | 96.25 | 96.00 | 96.00 | 95.75 | 95.75 | 94.00 |
|  | Methacrylic acid (part by mass) | 3.00 | 3.00 | 3.00 | 3.25 | 3.25 | 3.25 | 3.25 | 5.00 |
|  | 2,3-dichloro-1,3-butadiene (part by mass) | 1.00 | 1.00 | 0.75 | 0.75 | 0.75 | 1.00 | 1.00 | 1.00 |
|  | Polyvinyl alcohol (part by mass) | 4.1 | 4.1 | 4.1 | 4.1 | 4.1 | 4.1 | 4.1 | 4.1 |
|  | N-lauroylethanolamide (part by mass) | 0.6 | 0.6 | 0.6 | 0.6 | 0.6 | 0.6 | 0.6 | 0.6 |
|  | n-dodecyl mercaptan (part by mass) | 0.6 | 0.9 | 0.9 | 0.9 | 0.9 | 0.9 | 0.9 | 0.9 |
|  | 2-ethylhexyl thioglycolate (part by mass) | — | 0.21 | 0.25 | 0.3 | 0.33 | 0.33 | 0.33 | 0.57 |
|  | Pure water (part by mass) | 106 | 106 | 106 | 106 | 106 | 106 | 106 | 106 |
|  | pH | 7.1 | 7.0 | 7.6 | 7.4 | 7.7 | 7.6 | 7.6 | 6.9 |
|  | Solid content concentration (% by mass) | 47.0 | 46.0 | 45.6 | 45.6 | 45.8 | 47.2 | 47.2 | 47.2 |
|  | Gel content (% by mass) | 6.7 | 6.8 | 5.3 | 5.3 | 4.9 | 3.2 | 3.2 | 3.2 |
|  | Weight average molecular weight of tetrahydrofuran-soluble component ($\times 10^5$) | 2.30 | 1.61 | 1.42 | 1.15 | 1.05 | 0.90 | 0.90 | 0.84 |
|  | Y value obtained by substituting molecular weight above into $-1.2 \times X/100000 + 1.6$ | −1.16 | −0.33 | −0.10 | 0.22 | 0.34 | 0.52 | 0.52 | 0.59 |
|  | Y value obtained by substituting molecular weight above into $-4.2 \times X/100000 + 5.7$ | −3.96 | −1.06 | −0.26 | 0.87 | 1.29 | 1.93 | 1.93 | 2.17 |
| Adhesive agent | Chloroprene copolymer (part by mass) | 100 | 100 | 100 | 100 | 100 | 100 | 100 | 100 |
|  | Zinc oxide (part by mass) | 0.0 | 0.0 | 0.0 | 0.0 | 0.0 | 0.0 | 0.5 | 0.5 |
|  | Pressure-sensitive adhesion imparting agent (part by mass) | 30 | 30 | 30 | 30 | 33 | 30 | 30 | 30 |
|  | Wetting agent (part by mass) | 1.0 | 1.0 | 1.0 | 1.0 | 1.0 | 1.0 | 1.0 | 1.0 |
|  | Thickener (part by mass) | 0.2 | 0.2 | 0.2 | 0.2 | 0.2 | 0.2 | 0.2 | 0.2 |
|  | Pressure-sensitive adhesive strength (nK/m) | 0.35 | 0.39 | 0.49 | 0.64 | 0.48 | 0.22 | 0.45 | 0.62 |
|  | Peeling mode | Interfacial failure | Interfacial failure | Interfacial failure | Cohesive failure | Cohesive failure | Cohesive failure | Cohesive failure | Cohesive failure |

|  |  | Comp. Ex. 9 | Comp. Ex. 10 | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|---|---|
| Chloroprene Copolymer latex | Chloroprene (part by mass) | 91.50 | 96.00 | 96.00 | 96.25 | 95.75 | 86.75 | 86.75 | 97.00 |
|  | Methacrylic acid (part by mass) | 7.50 | 3.25 | 3.25 | 3.00 | 3.25 | 12.00 | 12.00 | 3.00 |
|  | 2,3-dichloro-1,3-butadiene (part by mass) | 1.00 | 0.75 | 0.75 | 0.75 | 1.00 | 1.25 | 1.25 | 0.00 |
|  | Polyvinyl alcohol (part by mass) | 3.0 | 4.1 | 4.1 | 4.1 | 4.1 | 3.0 | 3.0 | 4.1 |
|  | N-lauroylethanolamide (part by mass) | 0.6 | 0.6 | 0.6 | 0.6 | 0.6 | 0.6 | 0.6 | 0.6 |
|  | n-dodecyl mercaptan (part by mass) | 0.9 | 0.9 | 0.9 | 0.9 | 0.9 | 0.9 | 0.9 | 0.6 |
|  | 2-ethylhexyl thioglycolate (part by mass) | 0.43 | 0.3 | 0.33 | 0.3 | 0.33 | 0.43 | 0.43 | — |
|  | Pure water (part by mass) | 106 | 106 | 106 | 106 | 106 | 106 | 106 | 106 |
|  | pH | 7.1 | 7.4 | 7.7 | 7.6 | 7.6 | 7.0 | 7.0 | 7.2 |
|  | Solid content concentration (% by mass) | 45.1 | 45.6 | 45.8 | 45.8 | 47.2 | 45.4 | 45.4 | 46.8 |
|  | Gel content (% by mass) | 1.9 | 5.3 | 4.9 | 4.9 | 3.2 | 8.9 | 8.9 | 18.5 |
|  | Weight average molecular weight of tetrahydrofuran-soluble component ($\times 10^5$) | 0.89 | 1.15 | 1.05 | 1.25 | 0.90 | 0.99 | 0.99 | 2.20 |
|  | Y value obtained by substituting molecular weight above into $-1.2 \times X/100000 + 1.6$ | 0.53 | 0.22 | 0.34 | 0.10 | 0.52 | 0.41 | 0.41 | −1.04 |
|  | Y value obtained by substituting molecular weight above into $4.2 \times X/100000 + 5.7$ | 1.96 | 0.87 | 1.29 | 0.45 | 1.93 | 1.54 | 1.54 | −3.54 |
| Adhesive agent | Chloroprene copolymer (part by mass) | 100 | 100 | 100 | 100 | 100 | 100 | 100 | 100 |
|  | Zinc oxide (part by mass) | 0.5 | 1.0 | 2.0 | 0.5 | 2.0 | 0.0 | 0.5 | 0.0 |
|  | Pressure-sensitive adhesion imparting agent (part by mass) | 30 | 30 | 30 | 30 | 33 | 30 | 30 | 30 |
|  | Wetting agent (part by mass) | 1.0 | 1.0 | 1.0 | 1.0 | 1.0 | 1.0 | 1.0 | 1.0 |
|  | Thickener (part by mass) | 0.2 | 0.2 | 0.2 | 0.2 | 0.2 | 0.2 | 0.2 | 0.2 |
|  | Pressure-sensitive adhesive strength (nK/m) | 0.42 | 0.62 | 0.65 | 0.51 | 0.54 | 0.21 | 0.18 | 0.26 |
|  | Peeling mode | Cohesive failure | Interfacial failure | Interfacial failure | Interfacial failure | Interfacial failure | Interfacial failure | Interfacial failure | Interfacial failure |

Examples 2 to 8 and Comparative Examples 1 to 16

Chloroprene copolymer latices of Examples 2 to 8 and Comparative Examples 1 to 16 were prepared by performing the same operation as in Example 1, except that the use amounts of chloroprene, methacrylic acid, 2,3-dichloro-1,3-butadiene, n-dodecyl mercaptan, and 2-ethylhexyl thioglycolate were changed as illustrated in Tables 1, 2. Then, adhesive agents in Examples 2 to 8 and Comparative Examples 1 to 16 were manufactured by the same operation as in Example 1, except that the use amount of zinc oxide was changed as illustrated in Tables 1, 2.

[Evaluation of Chloroprene Copolymer Latices and Adhesive Agents]

The chloroprene copolymer latices of Examples 1 to 8 and Comparative Examples 1 to 16 obtained as described above were measured for the polymerization conversion, the pH, the solid content concentration, the content of the gel insoluble in tetrahydrofuran, and the weight average molecular weight of the tetrahydrofuran-soluble component and the adhesive agents of Examples 1 to 8 and Comparative Examples 1 to 16 were measured for the adhesive strength. Each measuring method is described below.

<Measuring Method for Solid Content Concentration>

The chloroprene copolymer latex is dried and solidified by heating at 141° C. for 30 minutes to obtain only the solid content. Then, the solid content concentration in the chloroprene copolymer latex is calculated from the mass of the chloroprene copolymer latex before the heating and the mass of the solid content obtained by the heating.

<Measuring Method for Polymerization Conversion>

The solid content concentration of the chloroprene polymer latex is measured as described above and the measured value of the solid content concentration is defined as S. The solid content concentration (theoretical value) when all monomers were polymerized, i.e., when the polymerization reaction proceeded by 100%, is theoretically calculated, and the theoretical value is defined as $T_{100}$. The solid content concentration (theoretical value) when monomers were not polymerized at all, i.e., when the polymerization reaction proceeded by 0%, is theoretically calculated, and the theoretical value is defined as $T_0$. The theoretical value $T_0$ is calculated including the masses of the catalyst, the surfactant, the reducing agent, and the chain transfer agent. Then, the polymerization conversion (unit: %) is calculated by Formula below.

Polymerization conversion=$(S-T_0)/(T_{100}-T_0) \times 100$

<Measuring Method for Content of Gel Insoluble in Tetrahydrofuran, Measuring Method for Content of Tetrahydrofuran-Soluble Component Soluble in Tetrahydrofuran>

1 g of the chloroprene copolymer latex was added dropwise to 100 mL of tetrahydrofuran, shaken for 12 hours, and then separating a supernatant into a solution phase and the other precipitation using a centrifuge. Then, the solution phase is heated at 100° C. for 1 hour to evaporate and dry and solidify tetrahydrofuran, and then the mass of the obtained dried solid substance is measured. Since the mass of the dried solid substance is the mass of the tetrahydrofuran-soluble component in the chloroprene copolymer, the mass of the tetrahydrofuran-soluble component is subtracted from the mass of the chloroprene copolymer, and then the content of the gel in the chloroprene copolymer is calculated using such a value as the mass of the gel. The mass of the chloroprene copolymer (A) is almost equal to the mass of the solid content in the chloroprene copolymer latex, and therefore such a value can be utilized.

<Measuring Method for Weight Average Molecular Weight of Tetrahydrofuran-Soluble Component>

The solution phase is separated in the same manner as the measuring method for the content of the gel insoluble in tetrahydrofuran described above, and then a diluted solution obtained by diluting the solution phase with tetrahydrofuran is subjected to GPC measurement to measure the weight average molecular weight (Mw) in terms of polystyrene.

The GPC measurement is performed under the conditions where the column temperature is 40° C. and the flow rate is 0.4 mL/min using an HP1050 series (trade name) manufactured by Yokogawa Analytical Systems Inc., as a GPC measuring apparatus, a differential refractive index detector RI-71 as a detector, and a Shodex (registered trademark) PLgel MiniMIX-B (particle diameter of filler: 10 μm) manufactured by Showa Denko K.K., as a column.

<Measuring Method for Adhesive Strength>

The adhesive agent was applied to cotton canvas (No. 9 canvas (No. 1209) defined in JIS L3102-1978) using a brush, dried at 40° C. for 1 hour, and then further dried at 70° C. for 1 hour. The adhesive agent was applied such that the application amount was 150 to 200 g/m².

A natural-colored board (200 mm long, 25 mm wide, 1 mm thick) formed of polypropylene was placed on the cotton canvas coated with the adhesive agent, and then the cotton canvas and the natural-colored board formed of polypropylene were pressure-bonded to each other at 23° C. to form a test piece. Then, after bonding, the test piece was cured for 3 days in the environment of a temperature of 23° C. and a relative humidity of 60% RH, and then the 180° peeling test defined in JIS K6854-2: 1999 was performed to measure the normal adhesive strength (kN/m). A peeled portion of the test piece after the 180° peel test was observed to evaluate whether the peeling mode was cohesive failure or interfacial failure.

In this example, the interfacial failure refers to a state where the peeling occurs at the interface between the natural-colored board formed of polypropylene and a layer of the adhesive agent and occurs when the adhesive strength to an adherend is lower than the strength of the layer of the adhesive agent. The cohesive failure refers to a state where a failure occurs in the layer of the adhesive agent to cause the peeling, occurs when the adhesive strength to an adherend exceeds the strength of the layer of the adhesive agent, and is an ideal peeling state for bonding of adherends having high strength.

The evaluation results of the chloroprene copolymer latices and the adhesive agents are illustrated in Tables 1, 2. FIG. 1 illustrates a graph illustrating the relationship between the amount Y of the metal oxide and the weight average molecular weight X of the tetrahydrofuran-soluble component in the adhesive agents of Examples 1 to 8 and Comparative Examples 1 to 16. In the graph in FIG. 1, the plots marked by 0 represent Examples and the plots marked by Δ represent Comparative Examples.

In the adhesive agents of Examples 1 to 8, the content of the metal oxide satisfies Formula: $-1.2 \times X/100000 + 1.6 < Y < -4.2 \times X/100000 + 5.7$, when the amount of the metal oxide based on 100 parts by mass of the chloroprene copolymer is defined as Y part (s) by mass and the weight average molecular weight of the tetrahydrofuran-soluble component is defined as X. Therefore, the adhesive agents of Examples 1 to 8 have adhesive strength to polypropylene as high as 0.77 to 1.16 kN/m (see Table 1). Hence, the adhesive agents of Examples 1 to 8 are suitable as an adhesive agent for bonding polypropylene.

In contrast, in all of the adhesive agents of Comparative Examples 1 to 3, the weight average molecular weight of the tetrahydrofuran-soluble component exceeded 140000, and therefore the adhesive strength to polypropylene was as low as less than 0.5 kN/m, and thus the adhesive strength was insufficient.

Further, in all of the adhesive agents of Comparative Examples 4 to 9 satisfying Formula: $-1.2 \times X/100000+1.6 > Y$ and all of the adhesive agents of Comparative Example 10 to 13 satisfying Formula: $Y > -4.2 \times X/100000+5.7$, in which the content of the metal oxide does not satisfy Formula above, the adhesive strength to polypropylene was as low as less than 0.65 kN/m, and thus the adhesive strength was insufficient.

In all of the adhesive agents of Comparative Examples 14, 15, the amount of the units derived from the $\alpha,\beta$-unsaturated carboxylic acid (A-2) in the chloroprene copolymer (A) exceeded 10 parts by mass when the amount of the chloroprene copolymer (A) was 100 parts by mass, and therefore the adhesive strength to polypropylene was as low as less than 0.5 kN/m, and thus the adhesive strength was insufficient.

The adhesive agent of Comparative Example 16 was free from the unit derived from the 2,3-dichloro-1,3-butadiene (A-3) in the chloroprene copolymer (A), and therefore the adhesive strength to polypropylene was as low as less than 0.5 kN/m, and thus the adhesive strength was insufficient.

The invention claimed is:

1. An adhesive agent comprising:
   a chloroprene copolymer latex containing a chloroprene copolymer (A); and
   a metal oxide (B), wherein
   the chloroprene copolymer (A) is a copolymer of a monomer group containing chloroprene (A-1), $\alpha,\beta$-unsaturated carboxylic acid (A-2), and 2,3-dichloro-1,3-butadiene (A-3),
   when an amount of the chloroprene copolymer (A) is 100 parts by mass, the chloroprene copolymer (A) contains 80.0 parts by mass or more and 99.4 parts by mass or less of a unit derived from the chloroprene (A-1), 0.5 part by mass or more and 10.0 parts by mass or less of a unit derived from the $\alpha,\beta$-unsaturated carboxylic acid (A-2), and 0.1 part by mass or more and 4.0 parts by mass or less of a unit derived from the 2,3-dichloro-1,3-butadiene (A-3),
   the chloroprene copolymer (A) has a tetrahydrofuran-soluble component soluble in tetrahydrofuran and a weight average molecular weight of the tetrahydrofuran-soluble component is 80000 or more and 90000 or less, and
   when an amount of the metal oxide (B) based on 100 parts by mass of the chloroprene copolymer (A) is defined as Y part(s) by mass and the weight average molecular weight of the tetrahydrofuran-soluble component is defined as X, a content of the metal oxide (B) satisfies Formula: $-1.2 \times X/100000+1.6 < Y < -4.2 \times X/100000+5.7$.

2. The adhesive agent according to claim 1, wherein the metal oxide (B) is zinc oxide.
3. The adhesive agent according to claim 1, wherein the $\alpha,\beta$-unsaturated carboxylic acid (A-2) is methacrylic acid.
4. The adhesive agent according to claim 1, wherein the weight average molecular weight of the tetrahydrofuran-soluble component is 84000 or more and 90000 or less.
5. The adhesive agent according to claim 1, wherein the chloroprene copolymer (A) has a gel insoluble in tetrahydrofuran and a content of the gel in the chloroprene copolymer (A) is 0.1% by mass or more and less than 15% by mass.
6. The adhesive agent according to claim 1, wherein the chloroprene copolymer latex contains an emulsifier.
7. The adhesive agent according to claim 6, wherein the emulsifier is partially saponified polyvinyl alcohol.
8. The adhesive agent according to claim 1, the adhesive agent forms a film-like shape.
9. The adhesive agent according to claim 1, the adhesive agent is used for bonding of an adherend formed of polyolefin.
10. An adhesion method comprising:
    bonding two adherends using the adhesive agent according to claim 1, wherein
    at least one of the two adherends is formed of polyolefin.
11. The adhesive agent according to claim 2, wherein the $\alpha,\beta$-unsaturated carboxylic acid (A-2) is methacrylic acid.
12. The adhesive agent according to claim 2, wherein the weight average molecular weight of the tetrahydrofuran-soluble component is 84000 or more and 90000 or less.
13. The adhesive agent according to claim 3, wherein the weight average molecular weight of the tetrahydrofuran-soluble component is 84000 or more and 90000 or less.
14. The adhesive agent according to claim 2, wherein the chloroprene copolymer (A) has a gel insoluble in tetrahydrofuran and a content of the gel in the chloroprene copolymer (A) is 0.1% by mass or more and less than 15% by mass.
15. The adhesive agent according to claim 3, wherein the chloroprene copolymer (A) has a gel insoluble in tetrahydrofuran and a content of the gel in the chloroprene copolymer (A) is 0.1% by mass or more and less than 15% by mass.
16. The adhesive agent according to claim 4, wherein the chloroprene copolymer (A) has a gel insoluble in tetrahydrofuran and a content of the gel in the chloroprene copolymer (A) is 0.1% by mass or more and less than 15% by mass.
17. The adhesive agent according to claim 2, wherein the chloroprene copolymer latex contains an emulsifier.
18. The adhesive agent according to claim 3, wherein the chloroprene copolymer latex contains an emulsifier.
19. The adhesive agent according to claim 4, wherein the chloroprene copolymer latex contains an emulsifier.
20. The adhesive agent according to claim 5, wherein the chloroprene copolymer latex contains an emulsifier.

* * * * *